Patented Apr. 22, 1947

2,419,294

UNITED STATES PATENT OFFICE 2,419,294

BENZOTHIAZOLE SULFENAMIDES AS FUNGICIDES

Joseph B. Skaptason, Woodbridge, Conn., assignor to United States Rubber Company, New York, N. Y., a corporation of New Jersey No Drawing. Application June 6, 1945, Serial No. 597,961

16 Claims. (Cl. 167—33)

This invention relates to new and useful improvements in fungicides. The invention further relates to methods of treating plants, and to methods of protecting organic material subject to attack by fungi, as the immunizing of seed, and the mildewproofing of fabrics and other material.

I have found that benzothiazolesulfenamides are effective fungicides. The compounds are known and have been disclosed as accelerators for the vulcanization of rubber. (U. S. patents to Harman 2,191,657; Carr 2,271,834; 2,339,552; 2,354,427; Smith 2,367,827). Benzothiazolesulfenamide may be represented as follows:

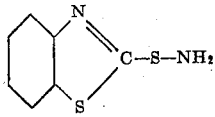

There is considerable confusion in the technical literature as to the nomenclature of compounds containing the —S—N linkage. The nomenclature followed in this specification considers benzothiazolesulfenamide as the amide of the hypothetical benzothiazolesulfenic acid

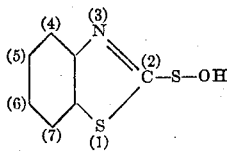

The structure of the benzothiazolesulfenamides may thus be represented by the general formula

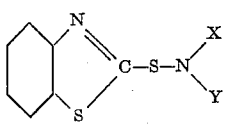

where X and Y each represent hydrogen, alkyl (including substituted alkyl, e. g. hydroxyalkyl or aminoalkyl), aralkyl, cycloalkyl, alkenyl (e. g. allyl or methallyl); or where X and Y in combination represent alkylene (e. g. pentamethylene) or an alkylene containing a hetero O, N or S atom in the chain (e. g. oxydiethylene, iminodiethylene, or thiodiethylene). The benzene nucleus may be substituted as with alkyl, alkoxy, halogen and nitro groups (e. g. 6-nitro, 5-nitro, 6-chloro, 5-methyl, 6-ethoxybenzothiazoles).

The compounds of the present invention may be used as seed protectants and to protect plants, which term includes plant parts, and soil from microorganisms harmful to seeds and plants. They may also be applied to prevent or retard fungus growth and the formation of, for example, mildew on organic material such as cellulosic material, rope, wood, fur, hair, feathers, cotton, wool, and leather. They may be applied as a dust, undiluted or mixed with a powdered solid carrier, such as clay or talc, or as a liquid or spray in a liquid carrier, as in solution in a suitable solvent, or suspended in a suitable non-solvent, for example, water. Preferably when applied in aqueous suspension, the composition contains a dispersing agent for the chemicals. In seed treatment, the benzothiazolesulfenamides are preferably applied to the seeds as by tumbling with the undiluted chemical, or with the chemical, admixed with a powdered solid carrier. In foliage treatment, the benzothiazolesulfenamides are preferably applied to the plant parts as by spraying with an aqueous suspension of the chemical containing a dispersing agent. Similar aqueous suspensions are preferred for the mildewproofing of textiles, such as cotton fabrics. The chemicals may be applied as to foliage by the aerosol method. Solutions for the aerosol treatment may be prepared by dissolving the chemical directly in the highly volatile liquid carrier or first dissolving the chemical in a less volatile solvent and then admixing such solution with the highly volatile liquid aerosol carrier. The compounds may be used admixed with carriers that are active of themselves, for example, other fungicides, or bactericides, insecticides, insectifuges, fertilizers, hormones, buffering or softening agents.

The following examples are given to illustrate the invention:

Example I

Uniform sized tomato plants of the variety Bonney Best (4 to 6 inches tall) were sprayed with aqueous suspensions containing 2000, 400, 80 and 16 parts per million (P. P. M.) respectively, of N-isopropyl benzothiazolesulfenamide,

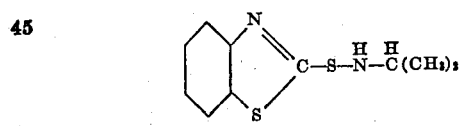

The aqueous suspensions of the N-isopropyl benzothiazolesulfenamide contained 1 part of Vatsol OS, a commercial dispersing agent (dioctyl sodium sulfo succinate), per 100 parts of the N-isopropyl benzothiazolesulfenamide. The spray deposits were allowed to dry on the foliage. The plants, together with untreated (check) plants, were uniformly inoculated by spraying onto the foliage an aqueous suspension of spores of *Alternaria solani*, the fungus responsible for a serious leaf blight disease of this crop. The plants were then placed in a chamber at 75° F. and 100 percent humidity for twenty hours, after which they were removed to normal greenhouse conditions. Sixty hours later the effectiveness of the chemical was determined by counting the blight lesions on the tomato plants treated with the different dosages of N-isopropyl benzothiazolesulfenamide, and comparing with the number of blight lesions on the check plants which were not treated with the chemical. The check plants showed an average of 332 blight lesions, whereas the number of lesions on the plants treated with dosages of 2000, 400, 80 and 16 P. P. M. of N-isopropyl benzothiazolesulfenamide was 21, 90, 115 and 105 respectively.

*Example II*

Tests similar to Example I with N-n-amyl benzothiazolesulfenamide,

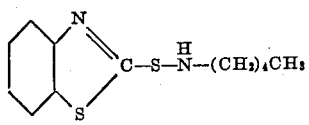

in dosages of 2000, 400, 80 and 16 P. P. M. showed 13, 44, 90 and 270 blight lesions, respectively, compared to an average of 332 lesions per check plant.

*Example III*

Tests similar to Example I with an aqueous suspension containing 2000 P. P. M. of N-cyclohexyl benzothiazolesulfenamide,

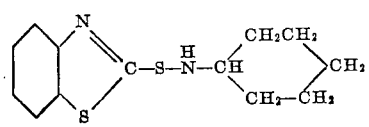

showed 2 blight lesions as compared with 219 lesions on the check plant.

*Example IV*

Tests similar to Example I with N,N-pentamethylene benzothiazolesulfenamide,

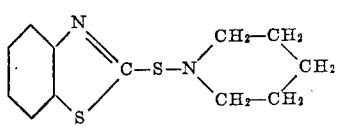

in dosages of 2000, 400, 80 and 16 P. P. M. showed 27, 45, 118 and 157 blight lesions, respectively, compared to an average of 332 lesions per check plant.

*Example V*

Tests similar to Example I with benzothiazolesulfenamide,

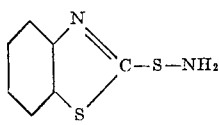

in dosages of 2000, 400, 80 and 16 P. P. M. showed 162, 187, 201 and 225 blight lesions respectively, compared to 241 lesions on the check plant.

*Example VI*

Tests similar to Example I with an aqueous suspension of 2000 P. P. M. of N,N-dibenzyl benzothiazolesulfenamide,

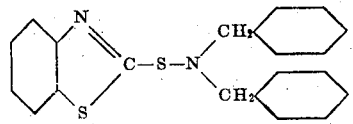

showed 57 blight lesions as compared with 225 lesions on the check plant.

*Example VII*

Tests similar to Example I with an aqueous suspension of 2000 P. P. M. of N-beta-aminoethyl benzothiazolesulfenamide,

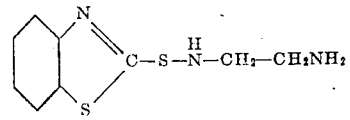

showed 3 blight lesions, as compared with 40 lesions on the check plant.

*Example VIII*

Tests similar to Example I with N-beta-hydroxyethyl benzothiazolesulfenamide,

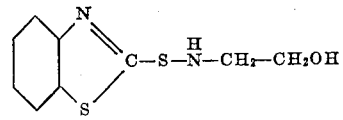

in dosages of 2000, 400, 80 and 16 P. P. M. showed 14, 15, 31 and 53 blight lesions, respectively, compared to 130 lesions on the check plant.

*Examples IX to XVI*

Tests similar to Example I were run with dosages of 2000, 400, 80 and 16 P. P. M. of various N-alkyl- and N,N-dialkyl benzothiazolesulfenamides in addition to those above illustrated. The results are shown in the following table:

| Ex. No. | Chemical | Blight Lesions per Plant | | | | |
| --- | --- | --- | --- | --- | --- | --- |
| | | At Dosages, P. P. M. | | | | Check (ave) |
| | | 2000 | 400 | 80 | 16 | |
| IX | N-n-butyl benzothiazole-sulfenamide | 21 | 70 | 89 | 183 | 332 |
| X | N,N-diethyl benzothia-sulfenamide | 23 | 22 | 130 | 190 | 332 |
| XI | N-ethylbenzothiazolesul-fenamide | 18 | 40 | 75 | 125 | 332 |
| XII | N,N-dimethyl benzothia-zole-sulfenamide | 22 | 21 | 79 | 115 | 332 |
| XIII | N,N-dibutyl benzothia-zole-sulfenamide | 43 | 71 | 65 | 94 | 332 |
| XIV | N-n-octyl benzothiazole-sulfenamide | 48 | 91 | 150 | 180 | 332 |
| XV | N-sec. butyl benzothia-zole-sulfenamide | 90 | 100 | 121 | 154 | 332 |
| XVI | N-n-octadecyl benzothia-zole-sulfenamide | 60 | 121 | 160 | 220 | 332 |

*Examples XVII and XVIII*

The following illustrates the immunizing of seeds by treatment with benzothiazolesulfenamides:

A number of barley seeds, known to be infected with the destructive root rotting fungus *Helminthosporium sativum*, were tumbled with 1% by weight of N-isopropyl benzothiazolesulfenamide, and other infected seeds were tumbled with 1% by weight of N-ethyl benzothiazolesulfenamide. Twenty-five each of the thus treated seeds, and 25 of the infected seeds not treated with any chemical, were placed on pads of filter paper in separate petri dishes which contained 2 cc. of a 2% aqueous dextrose solution, and allowed to stand for seven days at room temperature. After this time, the presence of the fungus on the seeds that were not successfully disinfected, could readily be detected by the presence of dark colored Helminthosporium sporulating on the surface of the seeds and in a narrow zone on the filter paper around the seeds. Observations at the end of seven days showed that none of the 25 tested seeds that were treated with N-isopropyl benzothiazole sulfenamide developed any fungus growth, 5 of the 25 tested seeds that were treated with N-ethyl benzothiazolesulfenamide were infected, and all 25 of the tested seeds that were not treated were infected.

Having thus described my invention, what I claim and desire to protect by Letters Patent is:

1. A fungicidal composition comprising a benzothiazolesulfenamide as an active ingredient, and a carrier therefor selected from the group consisting of powdered solid carriers, and water containing a dispersing agent.

2. A fungicidal composition comprising an aqueous suspension of a benzothiazolesulfenamide, said aqueous suspension containing a dispersing agent.

3. A fungicidal composition comprising an aqueous suspension of N-isopropyl benzothiazolesulfenamide, said aqueous suspension containing a dispersing agent.

4. A fungicidal composition comprising an aqueous suspension of N-n-amyl benzothiazolesulfenamide, said aqueous suspension containing a dispersing agent.

5. A fungicidal composition comprising an aqueous suspension of N-cyclohexyl benzothiazolesulfenamide, said aqueous suspension containing a dispersing agent.

6. The method of protecting organic material subject to attack by microorganisms which comprises applying to said material a liquid containing a benzothiazolesulfenamide.

7. The method of controlling fungi on growing plants which comprises treating the foliage of the plants with a benzothiazolesulfenamide.

8. The method of controlling fungi on growing plants which comprises spraying the foliage of the plants with an aqueous suspension of a benzothiazolesulfenamide.

9. The method of controlling fungi on growing plants which comprises spraying the foliage of the plants with an aqueous suspension of N-isopropyl benzothiazolesulfenamide.

10. The method of controlling fungi on growing plants which comprises spraying the foliage of the plants with an aqueous suspension of N-n-amyl benzothiazolesulfenamide.

11. The method of controlling fungi on growing plants which comprises spraying the foliage of the plants with an aqueous suspension of N-cyclohexyl benzothiazolesulfenamide.

12. The method of protecting seeds, plants and soil subject to attack or infestation by fungi which comprises treating said material with a benzothiazolesulfenamide.

13. The method of protecting seed against attack by micro-organisms which comprises treating said seed with a benzothiazolesulfenamide.

14. The method of immunizing seed which comprises treating said seed with N-isopropyl benzothiazolesulfenamide.

15. The method of controlling fungi on living organisms which comprises treating said organisms with a benzothiazolesulfenamide.

16. The method of controlling mildew on textiles which comprises treating said textiles with a benzothiazolesulfenamide.

JOSEPH B. SKAPTASON.

REFERENCES CITED

The following references are of record in the file of this patent:

UNITED STATES PATENTS

| Number | Name | Date |
| --- | --- | --- |
| 2,191,657 | Harmon | Feb. 27, 1940 |
| 2,271,834 | Carr | Feb. 3, 1942 |
| 2,354,427 | Carr | July 23, 1944 |
| 1,961,840 | Bolton | June 5, 1940 |

FOREIGN PATENTS

| Number | Country | Date |
| --- | --- | --- |
| 500,197 | British | Jan. 30, 1939 |